United States Patent
Yang

(10) Patent No.: US 12,507,138 B2
(45) Date of Patent: Dec. 23, 2025

(54) CELL ACCESSING METHOD, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 460 days.

(21) Appl. No.: 17/748,030

(22) Filed: May 19, 2022

(65) Prior Publication Data
US 2022/0279400 A1    Sep. 1, 2022

Related U.S. Application Data

(63) Continuation of application No. PCT/CN2019/121044, filed on Nov. 26, 2019.

(51) Int. Cl.
*H04W 36/00* (2009.01)
*H04W 36/08* (2009.01)
*H04W 36/36* (2009.01)

(52) U.S. Cl.
CPC . *H04W 36/0077* (2013.01); *H04W 36/00698* (2023.05); *H04W 36/08* (2013.01); *H04W 36/362* (2023.05)

(58) Field of Classification Search
CPC ....... H04W 36/0077; H04W 36/00698; H04W 36/08; H04W 36/362; H04W 76/15
See application file for complete search history.

(56) References Cited

U.S. PATENT DOCUMENTS

| | | | |
|---|---|---|---|
| 2018/0376457 A1 | 12/2018 | Tseng et al. | |
| 2019/0098623 A1* | 3/2019 | Van Der Velde | H04W 76/15 |
| 2019/0356460 A1* | 11/2019 | Tsuboi | H04W 8/22 |
| 2020/0022043 A1* | 1/2020 | Pelletier | H04W 36/305 |
| 2020/0077288 A1* | 3/2020 | Tsuboi | H04W 24/10 |
| 2021/0099926 A1* | 4/2021 | Chen | H04L 5/0098 |
| 2022/0167294 A1* | 5/2022 | Zheng | H04W 24/08 |
| 2022/0295571 A1* | 9/2022 | Da Silva | H04W 74/0866 |
| 2022/0369172 A1* | 11/2022 | Hwang | H04W 36/00698 |

(Continued)

FOREIGN PATENT DOCUMENTS

| | | |
|---|---|---|
| CN | 107006051 | 8/2017 |
| CN | 110419233 | 11/2019 |

(Continued)

OTHER PUBLICATIONS

Huawei, "(TP for NR_Mob_enh BL CR for TS 38.423): Conditional SN Change in MR-DC", 3GPP TSG-RAN3 Meeting #106 R3-196906, Nov. 2019, pp. 1-26.

(Continued)

*Primary Examiner* — Redentor Pasia
(74) *Attorney, Agent, or Firm* — Hodgson Russ LLP

(57) ABSTRACT

Disclosed is a cell accessing method, comprising: a terminal device transmits first indication information to a primary node, the first indication information being used for indicating information of target primary and secondary cells to be accessed by the terminal device. Also disclosed are another cell accessing method, an electronic device, and a storage medium.

14 Claims, 10 Drawing Sheets

(56) References Cited

U.S. PATENT DOCUMENTS

| | | | | |
|---|---|---|---|---|
| 2022/0386191 | A1* | 12/2022 | Wu | H04W 28/18 |
| 2022/0386197 | A1* | 12/2022 | Hwang | H04W 36/362 |
| 2022/0408323 | A1* | 12/2022 | Ishii | H04W 36/362 |
| 2022/0408325 | A1* | 12/2022 | Da Silva | H04W 76/15 |
| 2024/0073980 | A1* | 2/2024 | Wu | H04L 5/001 |

FOREIGN PATENT DOCUMENTS

| | | |
|---|---|---|
| EP | 3905833 | 11/2021 |
| WO | 2016024900 | 2/2016 |
| WO | 2021067891 | 4/2021 |

OTHER PUBLICATIONS

Huawei, "(TP for LTE_feMob BL CR for TS 36.423): Conditional SN Change in MR-DC", 3GPP TSG-RAN3 Meeting #106 R3-196907, Nov. 2019, pp. 1-2.

Intel Corporation , "Running CR for the introduction of NR mobility enhancement", 3GPP TSG-RAN WG2 Meeting #107bis R2-1913995, Oct. 2019, pp. 1-24.

"Search Report of Europe Counterpart Application No. 19954134. 3", issued on Nov. 7, 2022, pp. 1-12.

"International Search Report (Form PCT/ISA/210) of PCT/CN2019/ 121044," mailed on Jun. 30, 2020, with English translation thereof, pp. 1-6.

"Written Opinion of the International Searching Authority (Form PCT/ISA/237) of PCT/CN2019/121044," mailed on Jun. 30, 2020, with English translation thereof, pp. 1-6.

EPO, Communication for EP Application No. 19954134.3, Jul. 7, 2025.

* cited by examiner

Two component carriers with discontinuous frequencies aggregates into a 40 MHz bandwidth Five component carriers with continuous frequencies aggregates into a 100 MHz bandwidth

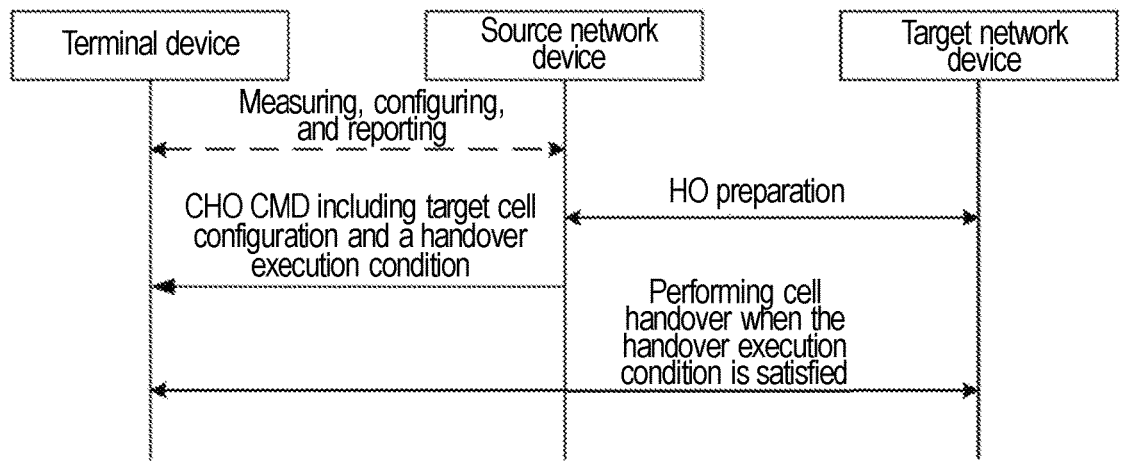

FIG. 10

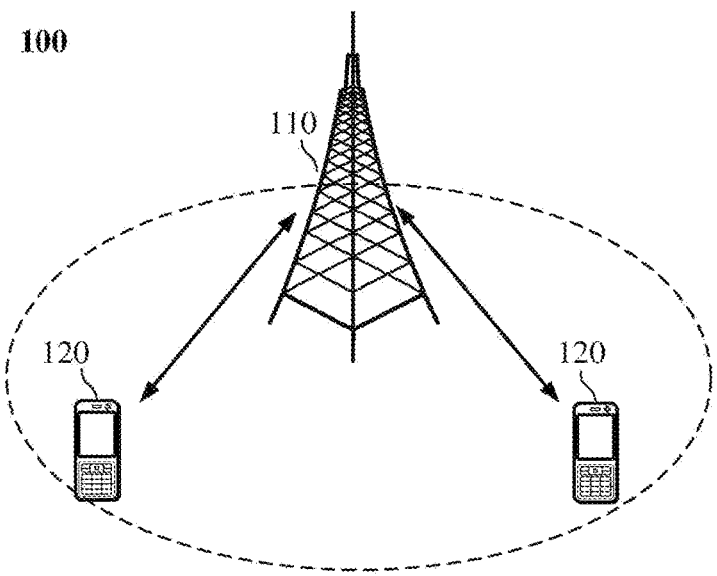

FIG. 11

A terminal device transmits first indication information to a master node, the first indication information being used for indicating information of a target primary secondary cell to be accessed by the terminal device — S201

FIG. 12

A master node receives first indication information transmitted by a terminal device, the first indication information is used for indicating information of the target primary secondary cell to be accessed by the terminal device — S301

FIG. 13

CELL ACCESSING METHOD, ELECTRONIC DEVICE, AND STORAGE MEDIUM

CROSS-REFERENCE TO RELATED APPLICATION

This application is a continuation of international PCT application serial no. PCT/CN2019/121044, filed on Nov. 26, 2019. The entirety of the above-mentioned patent application is hereby incorporated by reference herein and made a part of this specification.

BACKGROUND

Technical Field

The disclosure relates to the field of wireless communication technologies, and in particular, to a cell accessing method, an electronic device, and a storage medium.

Description of Related Art

In the related art, in the procedure of adding or changing a conditional primary secondary cell (PSCell) for user equipment (UE), how the master node (MN) quickly performs data forwarding with the secondary node (SN) corresponding to the target PSCell is a problem that needs to be solved.

SUMMARY

To solve the foregoing technical problem, the embodiments of the disclosure provide a cell accessing method, an electronic device, and a storage medium capable of implementing fast data forwarding between the MN and the SN corresponding to the target PSCell.

In the first aspect, an embodiment of the disclosure provides a cell accessing method, and the method includes the following step. A terminal device transmits first indication information to a master node. The first indication information is used for indicating information of a target primary secondary cell to be accessed by the terminal device.

In the second aspect, an embodiment of the disclosure provides a cell accessing method, and the method includes the following step. A master node receives first indication information transmitted by a terminal device. The first indication information is used for indicating information of a target primary secondary cell to be accessed by the terminal device.

In the third aspect, an embodiment of the disclosure provides a terminal device, and the terminal device includes: a first transmission unit, configured for transmitting first indication information to a master node. The first indication information is used for indicating information of a target primary secondary cell to be accessed by the terminal device.

In the fourth aspect, an embodiment of the disclosure provides a master node, and the master node includes a receiving unit, configured for receiving first indication information transmitted by a terminal device. The first indication information is used for indicating information of a target primary secondary cell to be accessed by the terminal device.

In the fifth aspect, an embodiment of the disclosure provides a terminal device including a processor and a memory configured for storing a computer program that can run on the processor. The processor is configured to perform the steps of the cell accessing method executed by the terminal device when running the computer program.

In the sixth aspect, an embodiment of the disclosure provides a master node including a processor and a memory configured for storing a computer program that can run on the processor. The processor is configured to perform the steps of the cell accessing method executed by the master node when running the computer program.

In the seventh aspect, an embodiment of the disclosure provides a chip including a processor configured to call and run a computer program from a memory, such that a device installed with the chip executes the cell accessing method executed by the terminal device.

In the eighth aspect, an embodiment of the disclosure provides a chip including a processor configured to call and run a computer program from a memory, such that a device installed with the chip executes the cell accessing method executed by the master node.

In the ninth aspect, an embodiment of the disclosure provides a storage medium storing an executable program, and the executable program implements the cell accessing method executed by the terminal device when being executed by a processor.

In the tenth aspect, an embodiment of the disclosure provides a storage medium storing an executable program, and the executable program implements the cell accessing method executed by the master node when being executed by a processor.

In the eleventh aspect, an embodiment of the disclosure provides a computer program product including a computer program instruction, and the computer program instruction enables a computer to execute the cell accessing method executed by the terminal device.

In the twelfth aspect, an embodiment of the disclosure provides a computer program product including a computer program instruction, and the computer program instruction enables a computer to execute the cell accessing method executed by the master node.

In the thirteenth aspect, an embodiment of the disclosure provides a computer program, and the computer program enables a computer to execute the cell accessing method executed by the terminal device.

In the fourteenth aspect, an embodiment of the disclosure provides a computer program, and the computer program enables a computer to execute the cell accessing method executed by the master node.

The cell accessing method, electronic device, and the storage medium provided by the embodiments of the disclosure include the following step. A terminal device transmits first indication information to a master node. The first indication information is used for indicating information of a target primary secondary cell to be accessed by the terminal device. In this way, the terminal device transmits the information of the target PSCell to be accessed to the MN when determining the target primary secondary cell. As such, the MN may know the target PSCell to be accessed by the terminal device as soon as possible, the MN forwards data to the SN corresponding to the target PSCell as soon as possible, and service continuity is thereby improved.

BRIEF DESCRIPTION OF THE DRAWINGS

FIG. 10 is a schematic diagram of a handover procedure of a conditional handover (CHO) according to the disclosure.

FIG. 11 is a schematic diagram of a structure forming a communication system according to an embodiment of the disclosure.

FIG. 12 is a schematic flow chart of optional processing of a cell accessing method applied in a terminal device according to an embodiment of the disclosure.

FIG. 13 is a schematic flow chart of optional processing of a cell accessing method applied in a master node according to an embodiment of the disclosure.

DESCRIPTION OF THE EMBODIMENTS

To better understand the features and technical content of the embodiments of the disclosure in detail, the implementation of the embodiments of the disclosure will be described in detail below with reference to the accompanying drawings. The accompanying drawings are provided for reference and description only, and are not used to limit the embodiments of the disclosure.

Before a cell accessing method provided by the embodiments of the disclosure is described in detail, a brief description of a cell handover procedure described in the related art is provided first.

With the pursuit of speed, latency, high-speed mobility, energy efficiency, and diversity and complexity of services in future life, the 3GPP international standards organization began the development of 5G. The main application scenarios of 5G are: enhance mobile broadband (eMBB), ultra reliable low latency communications (URLLC), and massive machine type communication (mMTC).

eMBB still aims to provide users with multimedia content, services, and data, and its demand is growing rapidly. On the other hand, since eMBB may be deployed in different scenarios, such as indoors, urban areas, rural areas, etc., its capabilities and requirements are considerably different and may not be generalized, and detailed analysis is required to be made together with specific deployment scenarios. Typical applications of URLLC include: industrial automation, power automation, telemedicine operations (surgery), traffic safety protection, etc. Typical features of mMTC include: high connection density, small data volume, delay-insensitive services, and low costs and long service life of modules.

Figure 1:
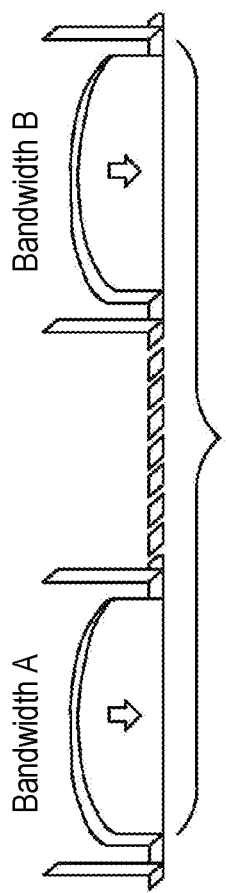
FIG. 1 is a schematic diagram of carrier aggregation according to the disclosure.
Figure 2:
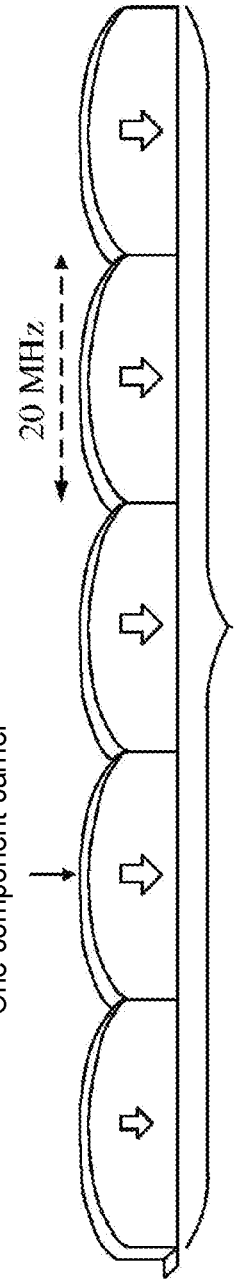
FIG. 2 is a schematic diagram of another carrier aggregation according to the disclosure.

To meet the demand for high speed, the 5G network also supports carrier aggregation (CA) technology. A schematic diagram of carrier aggregation is shown in FIG. 1, and a schematic diagram of another carrier aggregation is shown in FIG. 2. Carrier aggregation enables a NR system to support larger bandwidths through joint scheduling and use of resources on a plurality of component carriers (CCs), thereby enabling higher system peak rates. According to continuity of the aggregated carriers in a spectrum, carrier aggregation may be divided into continuous carrier aggregation and non-continuous carrier aggregation. According to whether the aggregated carriers are in a same band, carrier aggregation may be divided into: intra-band carrier aggregation and inter-band carrier aggregation.

There is only one primary component carrier (PCC) in the aggregated carriers, and the PCC provides radio resource control (RRC) signaling connection, non-access stratum (NAS) functions, security, etc. A physical uplink control Channel (PUCCH) is provided on the PCC and is provided only on the PCC. There are also secondary component carriers (SCCs) in the aggregated carriers, and the SCCs only provide additional radio resources. The PCC and the SCCs are collectively referred to as serving cells. It is stipulated in the standard that a maximum of 5 aggregated carriers are supported, that is, the aggregated maximum bandwidth is 100 MHZ, and the aggregated carriers belong to a same network device. All aggregated carriers use a same cell radio network temporary identifier (C-RNTI), and the network device implements that the C-RNTI does not collide in the cell where each carrier is located. Since both asymmetric carrier aggregation and symmetric carrier aggregation are supported, the aggregated carriers are required to have downlink and may not have uplink. Further, the primary component carrier must have its own physical downlink control channel (PDCCH) and a PUCCH, and only the primary component carrier cell has the PUCCH, and other secondary component carrier cells may have the PDCCH.

In early deployments of the NR system, it was difficult to obtain full NR coverage, so the typical network coverage is wide area LET system coverage and a NR system island coverage mode. While a large number of LTE systems are deployed in the spectrum below 6 GHz, there is less spectrum above 6 GHz that can be used for 5G. Therefore, the NR system studies the spectrum application above 6 GHz. However, a high frequency band has limited coverage and fast signal fading. In order to protect the early LTE system investment of mobile operators, a working mode between the LTE system and the NR system is proposed, called tight interworking.

Figure 3:
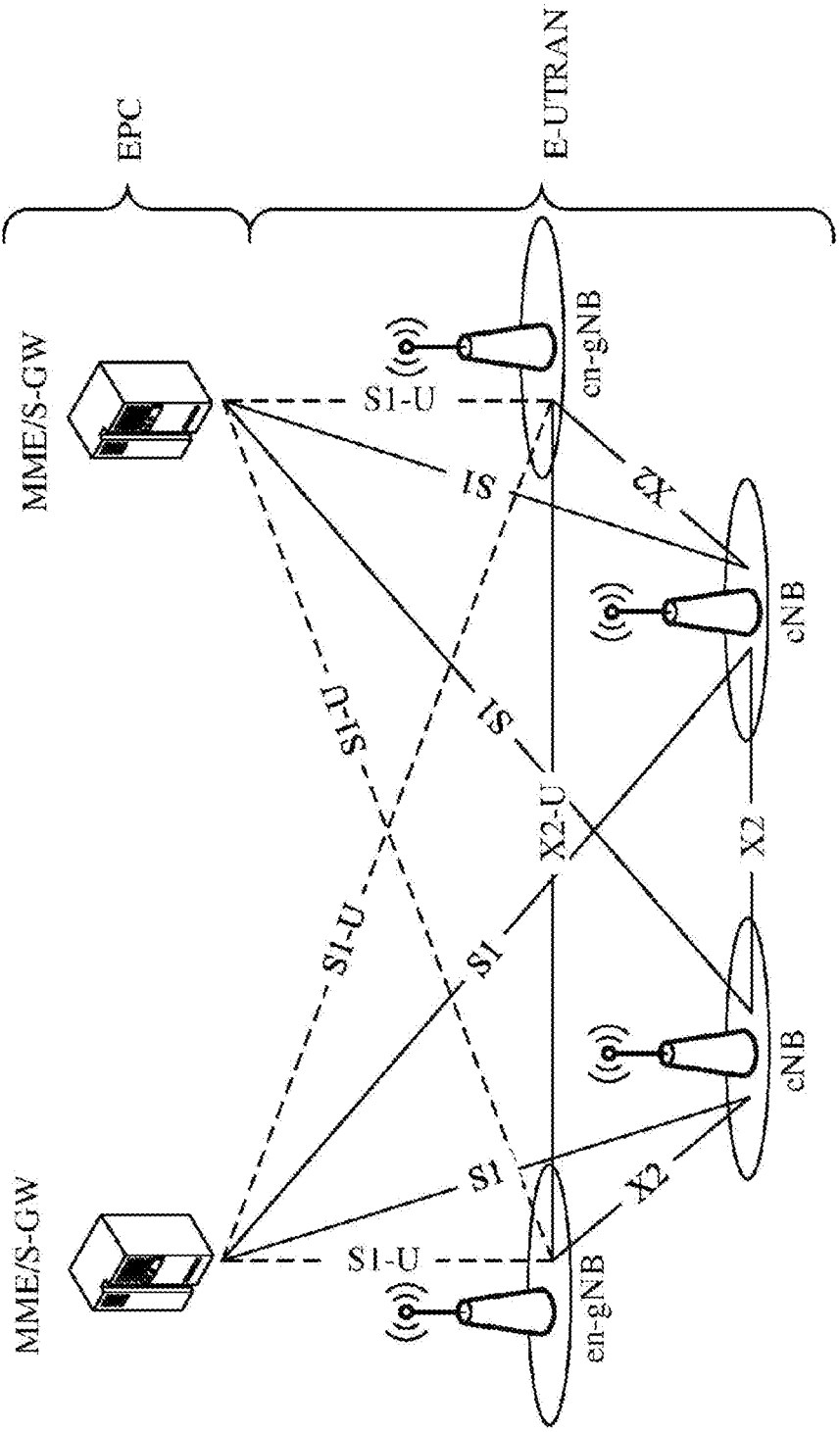
FIG. 3 is a schematic diagram of network deployment and a networking architecture of EN-DC according to the disclosure.

In order to implement the deployment and commercial application of 5G network as soon as possible, 3GPP first completed the first 5G version before the end of December 2017, namely LTE-NR dual connectivity (EN-DC). A schematic diagram of network deployment and a networking architecture of the EN-DC is shown in FIG. 3, a network device of the LTE system is used as a MN, and a network device of the NR system is used as a secondary node (SN).

Figure 4:
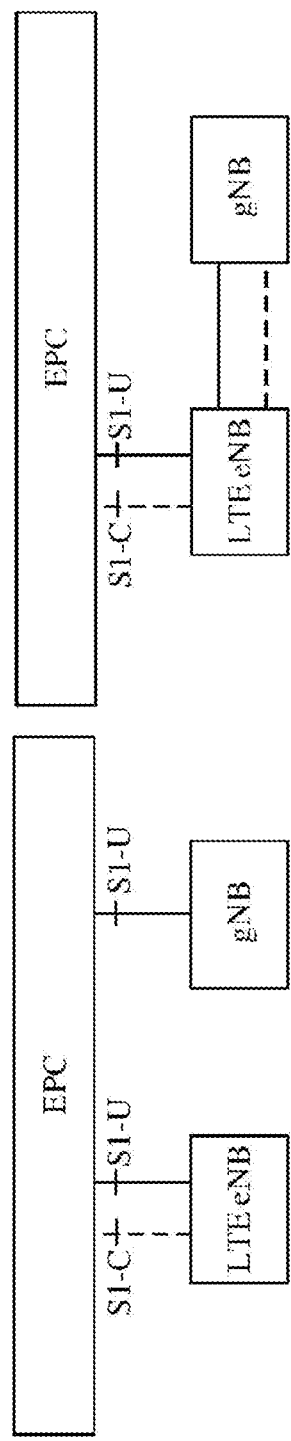
FIG. 4 is a schematic diagram of an EN-DC scenario according to the disclosure.

In the EN-DC scenario shown in FIG. 4, the MN (LTE eNB) is mainly used to implement RRC functions and a control plane leading to a core network (CN). The SN (gNB)

may be configured with auxiliary signaling, such as signaling radio bearer3 (SRB3), which mainly provides data transmission functions.

Figure 5:
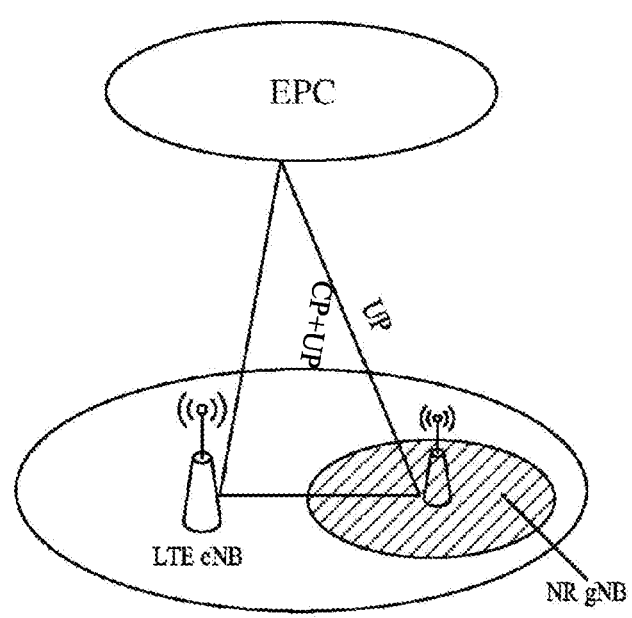
FIG. 5 is a schematic diagram of a network architecture of the EN-DC according to the disclosure.
Figure 6:
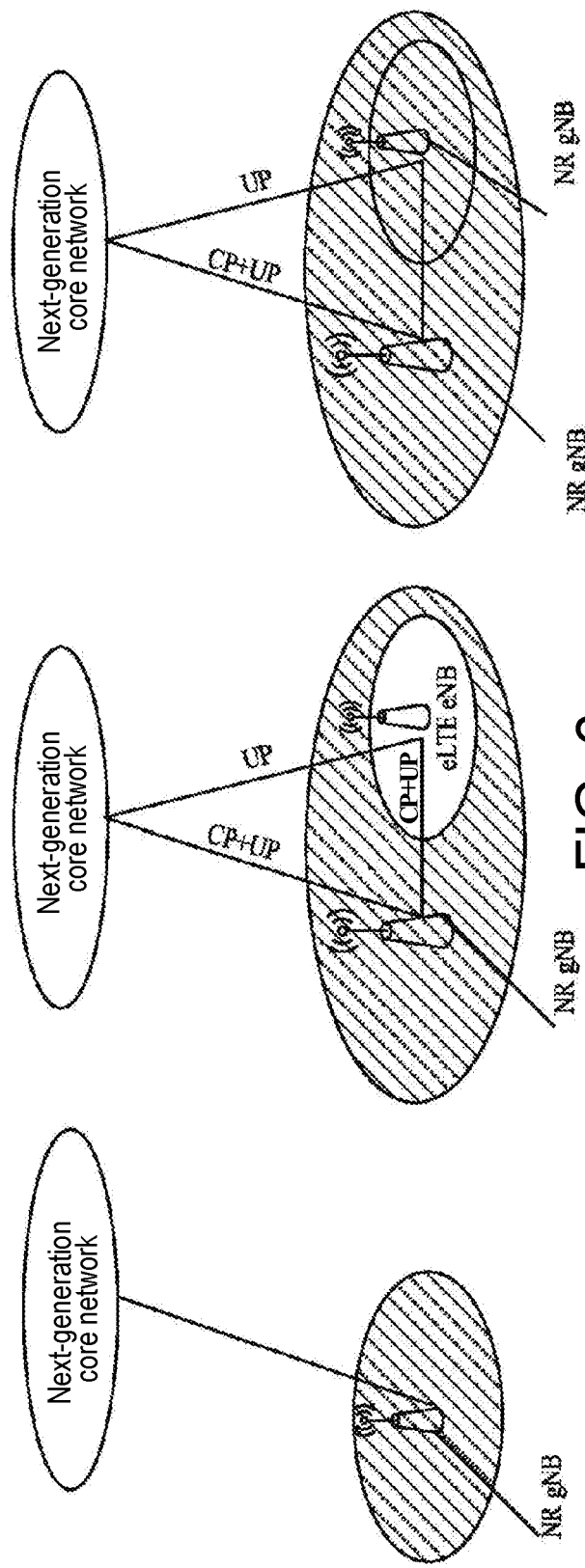
FIG. 6 is a schematic diagram of the network architecture of the NE-DC or NR-DC according to the disclosure.
Figure 7:
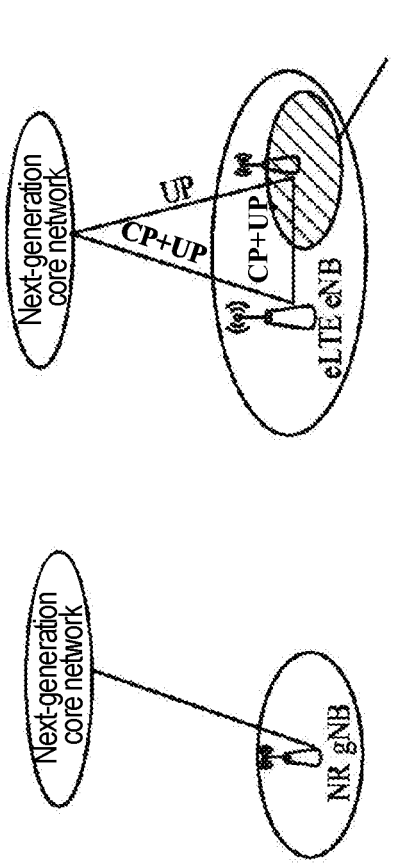
FIG. 7 is a schematic diagram of a network architecture of NGEN-DC according to the disclosure.

In addition to the EN-DC, the terminal device also supports other DC forms, such as NE-DC, 5GC-EN-DC, NR-DC, etc. The network architecture of the EN-DC is shown in FIG. 5, and the core network connected to an accessing network is an EPC. The network architecture of the NE-DC or NR-DC is shown in FIG. 6, the network architecture of NGEN-DC is shown in FIG. 7, and the core network connected to the accessing network is 5GC.

Figure 8:
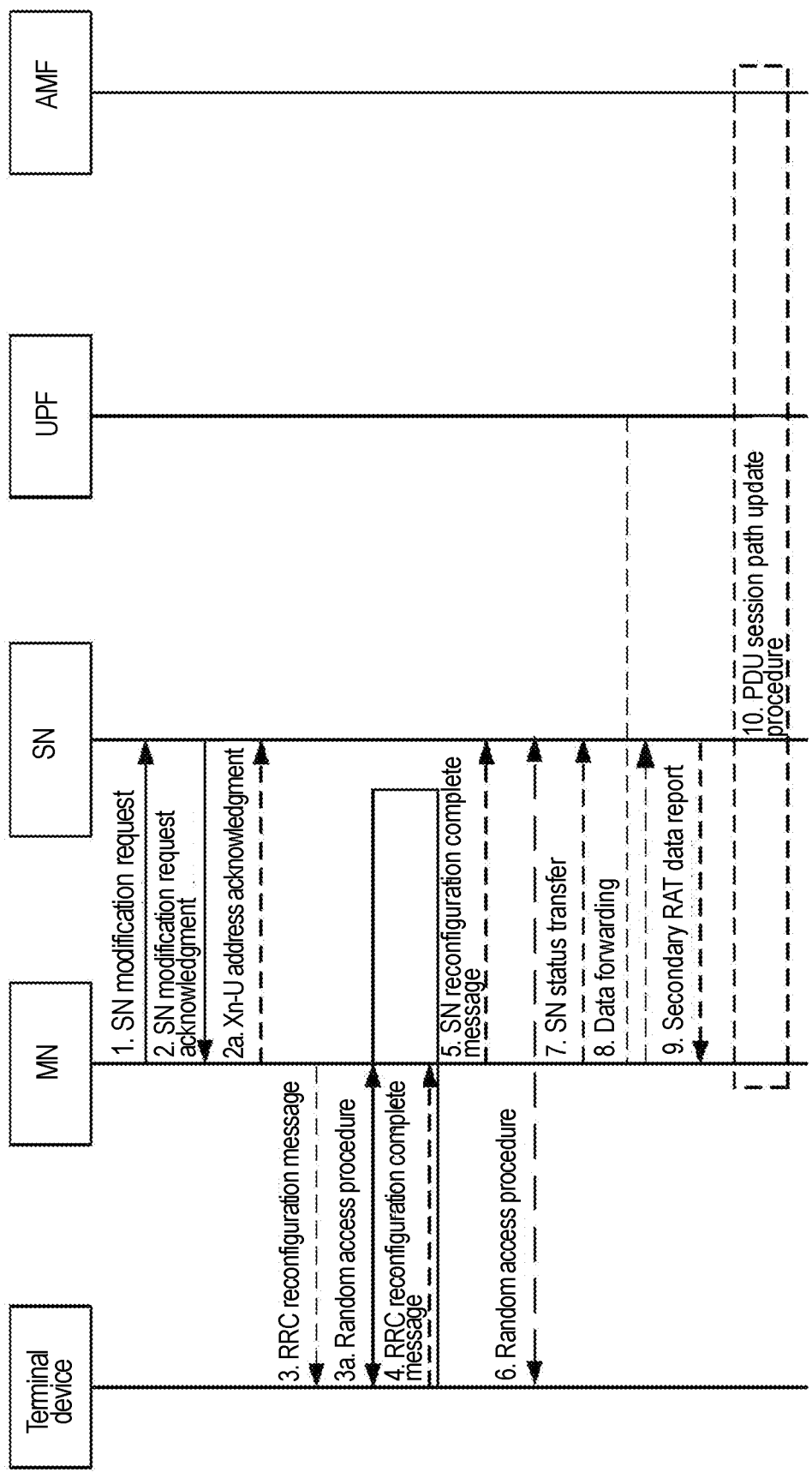
FIG. 8 is a schematic diagram of a PSCell change procedure triggered by a MN according to the disclosure.
Figure 9:
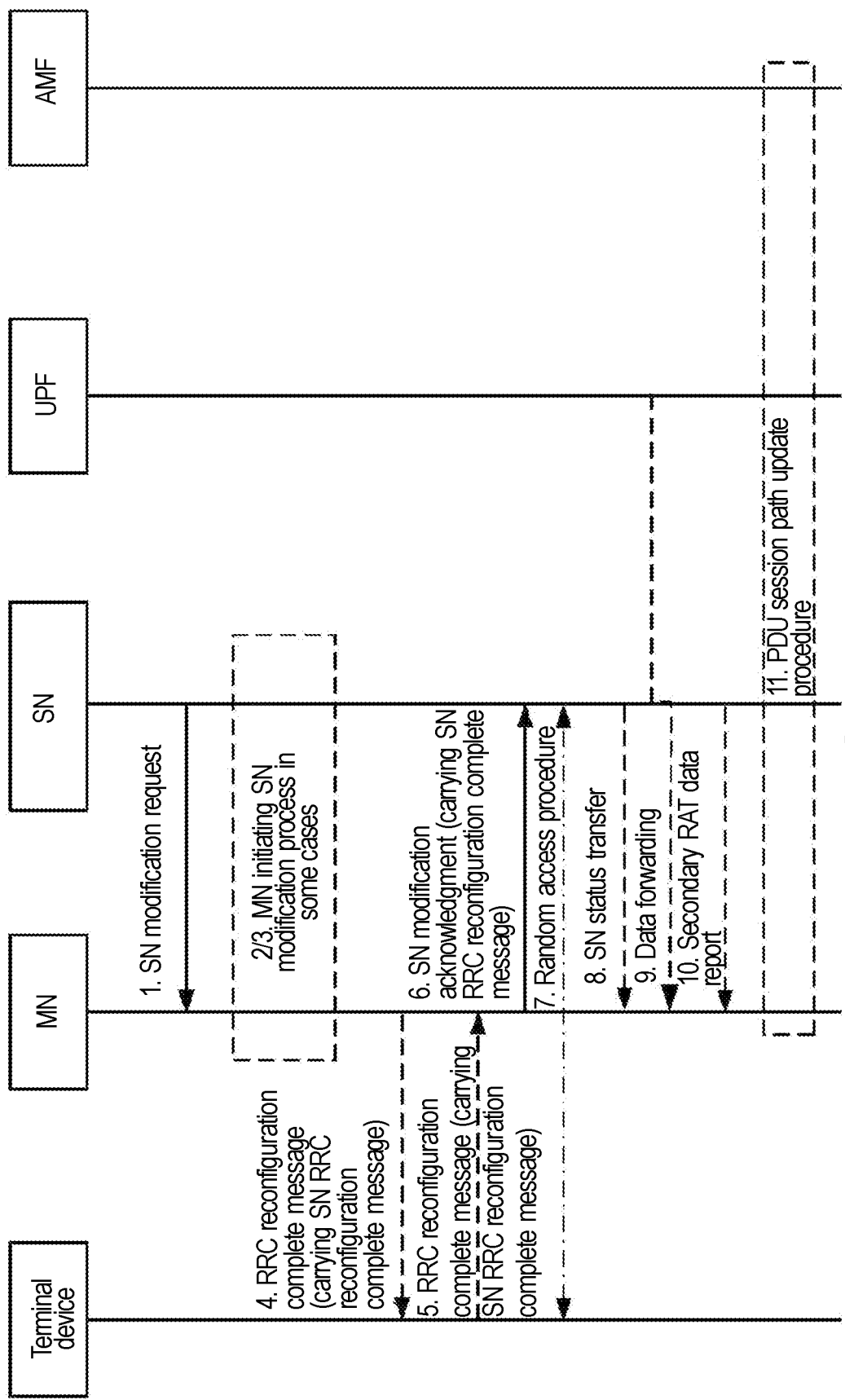
FIG. 9 is a schematic diagram of the PSCell change procedure triggered by a SN according to the disclosure.

In Rel-15, for the MR-DC scenario, a MN-triggered PSCell addition procedure is supported. Both a PSCell change procedure triggered by the MN and a PSCell change procedure triggered by the SN are supported. The change of a PSCell may occur within the same SN or between different SNs (e.g., between a source SN and a target SN). Herein, FIG. 8 is a schematic diagram of a PSCell change procedure triggered by the MN, and FIG. 9 is a schematic diagram of a PSCell change procedure triggered by the SN. In the PSCell change procedure triggered by the MN, the MN transmits a SN modification request message to the SN, and after receiving a SN modification request acknowledgment message transmitted by the SN, the PSCell change is initiated. During the PSCell change procedure triggered by the SN, the SN transmits the SN modification request message to the MN to initiate the PSCell change.

For the high-speed mobility scenario and the high-frequency deployment scenario, handovers are frequent and the handover success rate is low; therefore, the CHO, a CHO handover procedure is introduced. As shown in FIG. 10, the terminal device performs cell measurement, configuration, and reporting according to configuration information and measurement configuration of a target cell transmitted by a source network device. The source network device and a target network device prepare for handover. When the terminal device determines that a handover execution condition for the CHO of the target cell is satisfied, the terminal device executes the handover to the target cell according to a predetermined CHO command (e.g., triggering a random access procedure and transmitting a handover complete message). In this way, the problems caused by high-speed movement into the area with poor coverage resulting in a measurement report failing to be transmitted in time or failing to be transmitted and a handover command failing to be received may thus be avoided.

For the MR-DC scenario, a conditional PSCell addition and a conditional PSCell change are introduced. A node (e.g., MS or SN) that triggers the PSCell addition or the PSCell change may configure multiple candidate PSCells and an execution condition for each PSCell addition/change for the terminal device through an RRC message. When the execution condition of the PSCell addition/change of a specific candidate PSCell is satisfied, the terminal device may execute the PSCell addition/change procedure. The terminal device may transmit an RRC reconfiguration complete message to the MN, and an RRC reconfiguration complete message transmitted to the target SN corresponding to the PSCell to be accessed is embedded in the RRC reconfiguration complete message. However, since the MN does not know the cell accessing to which the PSCell is triggered by the terminal device, the MN cannot transmit the embedded RRC reconfiguration complete message to the target SN, nor can it forward data to the target SN as soon as possible.

The technical solutions provided by the embodiments of the disclosure may be applied to various communication systems, such as the global system of mobile communication (GSM) system, the code division multiple access (CDMA) system, the wideband code division multiple access (WCDMA) system, the general packet radio service (GPRS) system, the long term evolution (LTE) system, the LTE frequency division duplex (FDD) system, the LTE time division duplex (TDD) system, the advanced long term evolution (LTE-A) system, the new radio (NR) system, the evolution system of the NR, the LTE-based access to unlicensed spectrum (LTE-U) system, the NR-based access to unlicensed spectrum (NR-U) system, the universal mobile telecommunication system (UMTS), the worldwide interoperability for microwave access (WiMAX) communication system, the wireless local area networks (WLAN), wireless fidelity (WiFi), next-generation communication systems, or other communication systems.

Generally, a conventional communication system supports only a limited number of connections and may be easily implemented. However, with the development of communication technologies, mobile communication systems are required to support not only conventional communication, but also, for example, device to device (device to device, D2D) communication, machine to machine (M2M) communication, machine type communication (MTC), vehicle to vehicle (V2V) communication, etc. The embodiments of the disclosure may also be applied to these communication systems.

The system architecture and service scenarios described in the embodiments of the disclosure are for the purpose of illustrating the technical solutions of the embodiments of the disclosure more clearly, and do not constitute a limitation on the technical solutions provided by the embodiments of the disclosure. A person having ordinary skill in the art knows that with the evolution of the network architecture and the emergence of new service scenarios, the technical solutions provided in the embodiments of the disclosure are also applicable to similar technical problems.

The network devices involved in the embodiments of the disclosure may be common base stations (e.g., NodeBs, eNBs, or gNBs), new radio controllers (NR controllers), centralized units, NR base stations, remote radio modules, micro base stations, relays, distributed units, transmission reception points (TRPs), transmission points (TPs), or any other devices. The specific technology and specific device forms adopted by the network devices are not limited in the embodiments of the disclosure. For convenience of description, in all embodiments of the disclosure, the abovementioned devices that provide wireless communication functions for the terminal devices are collectively referred to as network devices.

In the embodiments of the disclosure, the terminal devices may be any terminals, for example, the terminal devices may be user equipment of machine type communication. That is, the terminal devices may also be referred to as user equipment UE, mobile stations (MS), mobile terminal, terminals, and the like. The terminal devices may communicate with one or more core networks via a radio access network (RAN). For instance, the terminal devices may be mobile phones (or "cellular" phones), computers with mobile terminals, or the like. For instance, the terminal devices may also be portable, pocket-sized, hand-held, computer-built, or vehicle-mounted mobile devices that exchange languages and/or data with the radio access network. There is no specific limitation in the embodiments of the disclosure.

Optionally, the network devices and the terminal devices may be deployed on land, including indoor or outdoor and hand-held or vehicle-mounted, may be deployed on water, and may also be deployed on aircraft, balloons, and satellites in the air. The application scenarios of the network devices and the terminal devices are not limited in the embodiments of the disclosure.

Optionally, communication between the network devices and the terminal devices and between a terminal device and a terminal device may be performed through licensed spectrum, communication may be performed through unlicensed spectrum, or communication may be performed simultaneously through licensed spectrum and unlicensed spectrum. Communication between the network devices and the terminal devices and between a terminal device and a terminal device may be performed over the spectrum below 7 gigahertz (GHz), over the spectrum above 7 GHz, or simultaneously using the spectrum below 7 GHz and above 7 GHz. The spectrum resources used between the network devices and the terminal devices are not limited in the embodiments of the disclosure.

Generally, a conventional communication system supports only a limited number of connections and may be easily implemented. However, with the development of communication technologies, mobile communication systems are required to support not only conventional communication, but also, for example, device to device (device to device, D2D) communication, machine to machine (M2M) communication, machine type communication (MTC), vehicle to vehicle (V2V) communication, etc. The embodiments of the disclosure may also be applied to these communication systems.

Exemplarily, a communication system 100 applied in the embodiments of the disclosure is shown in FIG. 11. The communication system 100 may include a network device 110, and the network device 110 may be a device communicating with terminal devices 120 (or referred to as communication terminals or terminals). The network device 110 may provide communication coverage for a specific geographic area and may communicate with terminal devices located in this coverage area. Optionally, the network device 110 may be a base station (base transceiver station, BTS) in a GSM system or a CDMA system, a base station (NodeB, NB) in a WCDMA system, or an evolutional base station (evolutional Node B, eNB, or eNodeB) in a LTE system, or a wireless controller in a cloud radio access network (CRAN), or the network device may be a mobile switching center, a relay station, an access point, a vehicle-mounted device, a wearable device, a hub, a switch, a bridge, a router, a network side device in a 5G network, or a network device in a public land mobile network (PLMN) that evolves in the future.

The communication system 100 also includes at least one terminal device 120 located within the coverage area of the network device 110. The "terminal device" used herein includes but not limited to connection via a wired line such as via a public switched telephone network (PSTN), a digital subscriber line (DSL), a digital cable, direct cable connection, and/or another data connection/network, and/or via a wireless interface such as a cellular network, a wireless local area network (WLAN), a digital television network such as a DVB-H network, a satellite network, an AM-FM broadcast transmitter, and/or another terminal device set to receive/transmit communication signals, and/or an Internet of Things (IoT) device. The terminal device set to communicate through a wireless interface may be referred to as a "wireless communication terminal", a "wireless terminal", or a "mobile terminal". Examples of the mobile terminal include but not limited to a satellite or cellular phone and a personal communications system (PCS) terminal capable of combining a cellular radio phone with data processing, fax, and data communication capabilities, and may include a radio phone, a pager, Internet/Intranet access, a web browser, a memo pad, a calendar, and/or a PDA of a global positioning system (GPS) receiver, as well as a conventional laptop and/or palmtop receiver, or other electronic devices including a radio telephone transceiver. The terminal device may refer to an access terminal, user equipment (UE), a user unit, a user station, a mobile station, a mobile platform, a remote station, a remote terminal, mobile equipment, a user terminal, a terminal, a wireless communication device, a user agent, or a user device. The access terminal may be a cellular phone, a cordless phone, a session initiation protocol (SIP) phone, a wireless local loop (WLL) station, a personal digital assistant (PDA), a handheld device with wireless communication functions, a computing device or other processing devices connected to a wireless modem, a vehicle-mounted device, a wearable device, a terminal device in a 5G network, or a terminal device in a PLMN that evolves in the future.

Optionally, device to device (D2D) communication may be performed between the terminal devices 120.

Optionally, the 5G system or 5G network may also be referred to as a new radio (NR) system or NR network.

FIG. 11 schematically illustrates one network device and two terminal devices, and optionally, the communication system 100 may include a plurality of network devices, and the coverage area of each network device may include other numbers of terminal devices, which is not limited in the embodiments of the disclosure.

Optionally, the communication system 100 may further include other network entities such as a network controller, a mobility management entity, etc., which are not limited in the embodiments of the disclosure.

It should be understood that a device with a communication function in the network/system in the embodiments of the disclosure may be referred to as a communication device. Taking the communication system 100 shown in FIG. 11 as an example, the communication device may include the network device 110 and the terminal devices 120 having communication functions. The network device 110 and the terminal devices 120 may be the specific devices described above, and description thereof is not repeated herein. The communication device may also include other devices in the communication system 100, such as other network entities such as a network controller and a mobility management entity, which are not limited in the embodiments of the disclosure.

An optional processing process of a cell accessing method applied in a terminal device provided by the embodiments of the disclosure is shown in FIG. 12, and the method includes the following step.

In step S201, a terminal device transmits first indication information to a master node. The first indication information is used for indicating information of a target primary secondary cell to be accessed by the terminal device.

In some embodiments, the terminal device transmits the first indication information to the MN under the condition that an execution condition of PSCell addition or an execution condition of PSCell change is satisfied. In some optional scenarios, the SN configures the candidate PSCell for the conditional PSCell addition/change, the addition execution condition of the conditional PSCell addition, and the change execution condition of the conditional PSCell change for the terminal device through the RRC reconfiguration message on the signaling radio bearer 1 (SRB1) of the MN. In the case that the addition execution condition of the candidate PSCell or the change execution condition of the candidate PSCell is satisfied, the terminal device transmits a first indication information message to the MN.

In some embodiments, the information of the target PSCell includes at least one of the following: a physical cell identifier (PCI) of the target PSCell, the PCI and frequency point information of the target PSCell, a cell global identifier (CGI) of the target PSCell, and index information of the target PSCell. Herein, the CGI of the target PSCell may include: an evolved universal terrestrial radio access network cell global identifier (E-UTRAN cell global identifier, ECGI) or a new radio cell global identifier (NR cell global identifier, NCGI). Herein, the index information of the target PSCell may be index information corresponding to the target PSCell among candidate PSCells that the terminal device can perform conditional PSCell addition/change.

In some embodiments, the first indication information is carried in a first RRC reconfiguration complete message, and the first RRC reconfiguration complete message may be transmitted to the MN by the terminal device. The first RRC reconfiguration complete message may also be referred to as an MN RRC reconfiguration complete message.

In some embodiments, the first indication information may be used for a conditional PSCell addition procedure, or the first indication information is used for a conditional PSCell change procedure.

The cell accessing method provided by the disclosure may further include the following step.

The terminal device transmits a second RRC reconfiguration complete message to the master node.

In some embodiments, the second RRC reconfiguration complete message is the message transmitted to the SN, so that the second RRC reconfiguration complete message may also be referred to as a SN RRC reconfiguration complete message. During specific implementation, the master node may transmit the second RRC reconfiguration complete message to a SN corresponding to the target PSCell according to the first indication information.

In some embodiments, the second RRC reconfiguration complete message is carried in the first RRC reconfiguration complete message, for example, the second RRC reconfiguration complete message is embedded in the first RRC reconfiguration complete message.

In some embodiments, the second RRC reconfiguration complete message may also be independent of the first RRC reconfiguration complete message, that is, the second RRC reconfiguration complete message is not carried in the first RRC reconfiguration complete message.

After transmitting the first RRC reconfiguration complete message to the MN, the terminal device may initiate a random access procedure to the target PSCell.

In the embodiments of the disclosure, the terminal device transmits the information of the target PSCell to be accessed to the MN when it is determined that the execution condition of PSCell addition or the execution condition of PSCell change is satisfied. As such, the MN may know the target PSCell to be accessed by the terminal device as soon as possible, the MN forwards data to the SN corresponding to the target PSCell as soon as possible, and service continuity is thereby improved.

An optional processing process of a cell accessing method applied in a MN provided by the embodiments of the disclosure is shown in FIG. 13, and the method includes the following step.

In step S301, the MN receives first indication information transmitted by a terminal device. The first indication information is used for indicating information of a target PSCell to be accessed by the terminal device.

In some embodiments, the information of the target PSCell includes at least one of the following: a PCI of the target PSCell, the PCI and frequency point information of the target PSCell, a CGI of the target PSCell, and index information of the target PSCell. Herein, the CGI of the target PSCell may include: ECGI or NCGI. Herein, the index information of the target PSCell may be index information corresponding to the target PSCell among candidate PSCells that the terminal device can perform conditional PSCell addition/change.

In some embodiments, the first indication information is carried in a first RRC reconfiguration complete message, and the first RRC reconfiguration complete message may be transmitted to the MN by the terminal device. The first RRC reconfiguration complete message may also be referred to as an MN RRC reconfiguration complete message.

In some embodiments, the first indication information may be used for a conditional PSCell addition procedure, or the first indication information is used for a conditional PSCell change procedure.

In some embodiments, the cell accessing method may further include the following step.

The MN receives a second RRC reconfiguration complete message transmitted by the terminal device.

In some embodiments, the second RRC reconfiguration complete message may also be referred to as a SN RRC reconfiguration complete message, and the MN may transmit the second RRC reconfiguration complete message to a SN corresponding to the target PSCell according to the first indication information.

In some embodiments, the second RRC reconfiguration complete message is carried in the first RRC reconfiguration complete message, for example, the second RRC reconfiguration complete message is embedded in the first RRC reconfiguration complete message.

In some embodiments, the second RRC reconfiguration complete message may also be independent of the first RRC reconfiguration complete message, that is, the second RRC reconfiguration complete message is not carried in the first RRC reconfiguration complete message.

In some embodiments, the cell accessing method may further include the following step.

The MN transmits the second RRC reconfiguration complete message to a secondary node corresponding to the target primary secondary cell according to the first indication information.

In some embodiments, the MN determines the SN corresponding to the target PSCell according to the information of the target PSCell in the first indication information and transmits the second RRC reconfiguration complete message to the SN corresponding to the target PSCell.

Figure 14:
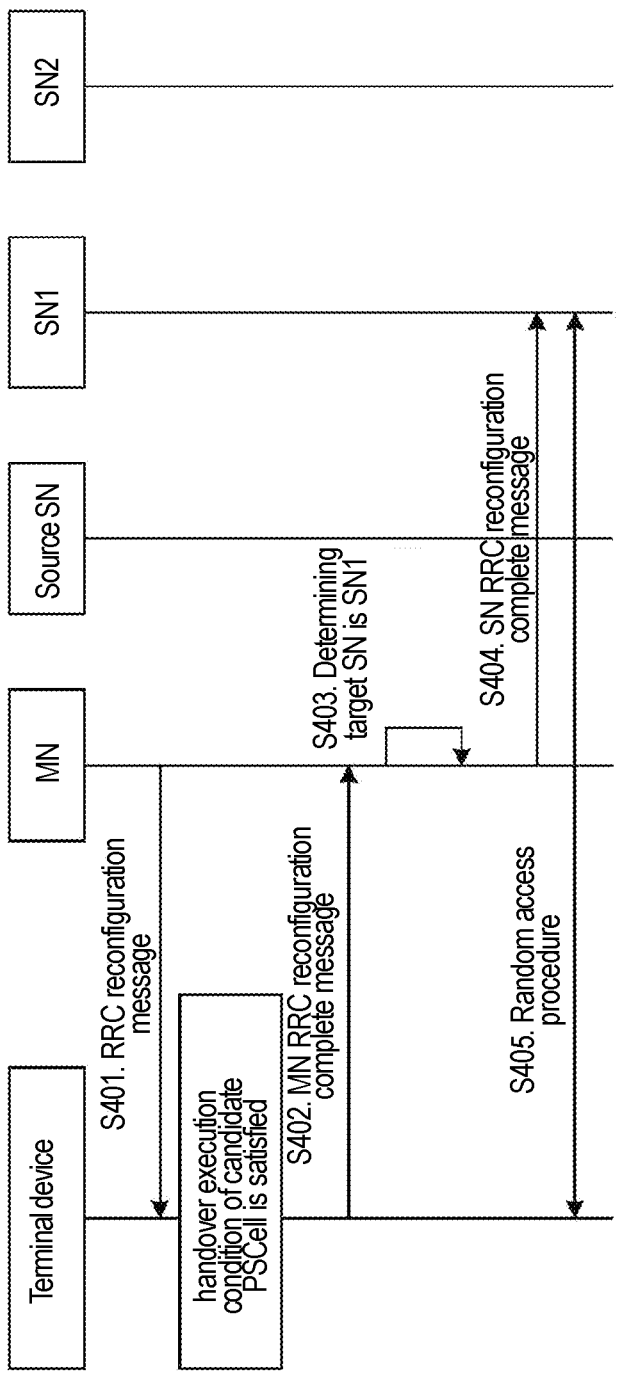
FIG. 14 is a schematic flow chart of detailed processing of the cell accessing method according to an embodiment of the disclosure.

The SNs corresponding to the candidate PSCells are SN1 and SN2 in the following. The first indication information is used for the conditional PSCell change procedure as an example, and the detailed processing flow of the cell accessing method provided by the disclosure is described as follows, as shown in FIG. 14.

In step S401, the MN transmits a MN RRC reconfiguration message to the terminal device.

In some embodiments, the MN RRC reconfiguration message may include a candidate PSCell of the conditional PSCell change, an addition execution condition of the conditional PSCell addition, and a change execution condition of the conditional PSCell change.

In step S402, in the case that the change execution condition of a candidate PSCell1 is satisfied, the terminal device transmits the MN RRC reconfiguration complete message to the MN.

In some embodiments, in the case that the change execution condition of the candidate PSCell1 is satisfied, the candidate PSCell1 is the target PSCell. The MN RRC reconfiguration complete message may include: information of the target PSCell and the SN RRC reconfiguration complete message.

In step S403, the MN determines that the target SN is the SN1 according to the information of the target PSCell.

In step S404, the MN transmits the SN RRC reconfiguration complete message to the SN1.

In step S405, the terminal device initiates a random access procedure.

Note that in the embodiments of the disclosure, the master node may be a network device corresponding to a primary cell (PCell), or the master node may be a network device corresponding to a serving cell. The SN is a network device corresponding to a PSCell or a network device corresponding to a secondary cell (SCell).

Figure 15:
FIG. 15 is a schematic view of a structure forming the terminal device according to an embodiment of the disclosure.

In order to allow the foregoing cell accessing method executed by the terminal device to be implemented, a terminal device is further provided in the embodiments of the disclosure. A schematic view of a structure forming a terminal device 500 is shown in FIG. 15, and the terminal device 500 includes: a first transmission unit 501.

The first transmission unit 501 is configured for transmitting first indication information to a master node. The first indication information is used for indicating information of a target primary secondary cell to be accessed by the terminal device.

In some embodiments, the information of the target primary secondary cell includes at least one as follows.

The information of the target primary secondary cell includes at least one of: a PCI of the target primary secondary cell, the PCI and frequency point information of the target primary secondary cell, a CGI of the target primary secondary cell, and index information of the target primary secondary cell.

In some embodiments, the CGI of the target primary secondary cell includes: ECGI or NCGI.

In some embodiments, the first indication information is carried in a first RRC reconfiguration complete message.

In some embodiments, the first transmission unit 501 is further configured for transmitting a second RRC reconfiguration complete message to the master node. The second RRC reconfiguration complete message is configured for being transmitted to a secondary node corresponding to the target primary secondary cell by the master node according to the first indication information.

In some embodiments, the second RRC reconfiguration complete message is carried in the first RRC reconfiguration complete message.

In some embodiments, the first indication information is used for a conditional PSCell addition procedure, or the first indication information is used for a conditional PSCell change procedure.

Figure 16:
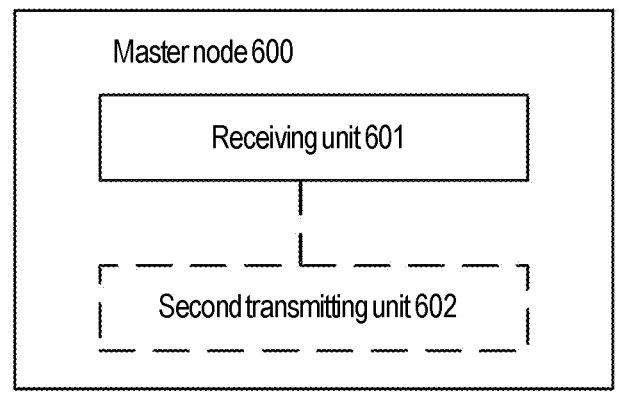
FIG. 16 is a schematic view of a structure forming the MN according to an embodiment of the disclosure.

In order to allow the foregoing cell accessing method executed by the master node to be implemented, a master node is further provided in the embodiments of the disclosure. A schematic view of a structure forming a master node 600 is shown in FIG. 16, and the master node 600 includes: a receiving unit 601.

The receiving unit 601 is configured for receiving first indication information transmitted by a terminal device. The first indication information is used for indicating information of a target primary secondary cell to be accessed by the terminal device.

In some embodiments, the information of the target primary secondary cell includes at least one of the following: a PCI of the target primary secondary cell, the PCI and frequency point information of the target primary secondary cell, a CGI of the target primary secondary cell, and index information of the target primary secondary cell.

In some embodiments, the CGI of the target primary secondary cell includes: ECGI or NCGI.

In some embodiments, the first indication information is carried in a first RRC reconfiguration complete message.

In some embodiments, the receiving unit 601 is further configured for receiving a second RRC reconfiguration complete message transmitted by the terminal device.

In some embodiments, the master node 600 further includes: a second transmitting unit 602.

The second transmitting unit 602 is configured for transmitting the second RRC reconfiguration complete message to a secondary node corresponding to the target primary secondary cell according to the first indication information.

In some embodiments, the second RRC reconfiguration complete message is carried in the first RRC reconfiguration complete message.

In some embodiments, the first indication information is used for a conditional PSCell addition procedure, or the first indication information is used for a conditional PSCell change procedure.

The embodiments of the disclosure further provide a terminal device including a processor and a memory configured for storing a computer program that can run on the processor. The processor is configured to perform the steps of the cell accessing method executed by the terminal device when running the computer program.

The embodiments of the disclosure further provide a master node including a processor and a memory configured for storing a computer program that can run on the processor. The processor is configured to perform the steps of the cell accessing method executed by the master node when running the computer program.

The embodiments of the disclosure further provide a chip including a processor configured to call and run a computer program from a memory, such that a device installed with the chip executes the cell accessing method executed by the terminal device.

The embodiments of the disclosure further provide a chip including a processor configured to call and run a computer program from a memory, such that a device installed with the chip executes the cell accessing method executed by the master node.

The embodiments of the disclosure further provide a storage medium storing an executable program, and the executable program implements the cell accessing method executed by the terminal device when being executed by a processor.

The embodiments of the disclosure further provide a storage medium storing an executable program, and the executable program implements the cell accessing method executed by the master node when being executed by a processor.

The embodiments of the disclosure further provide a computer program product including a computer program instruction, and the computer program instruction enables a computer to execute the cell accessing method executed by the terminal device.

The embodiments of the disclosure further provide a computer program product including a computer program instruction, and the computer program instruction enables a computer to execute the cell accessing method executed by the master node.

The embodiments of the disclosure further provide a computer program, and the computer program enables a computer to execute the cell accessing method executed by the terminal device.

The embodiments of the disclosure further provide a computer program, and the computer program enables a computer to execute the cell accessing method executed by the master node.

Figure 17:
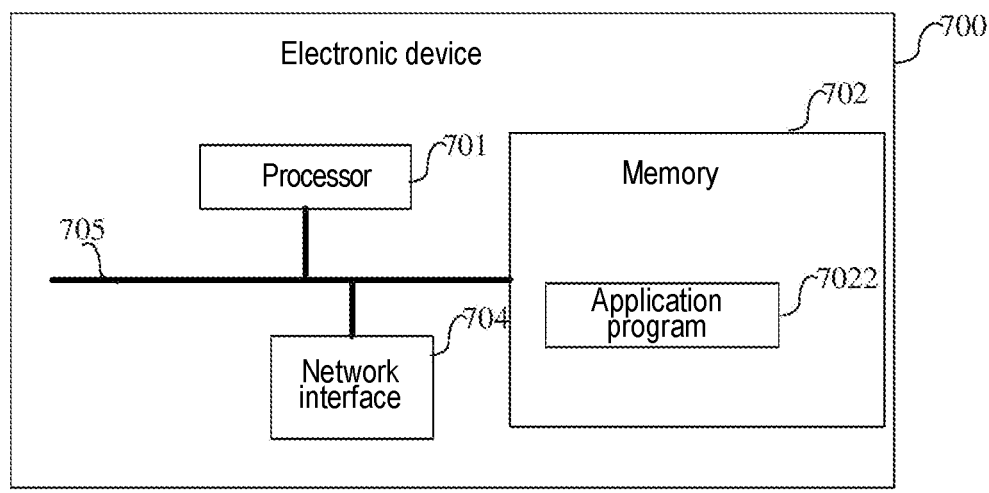
FIG. 17 is a schematic view of a hardware structure forming an electronic device according to an embodiment of the disclosure.

FIG. 17 is a schematic view of a hardware structure forming an electronic device (terminal device or MN) according to an embodiment of the disclosure. An electronic device 700 includes: at least one processor 701, a memory 702, and at least one network interface 704. The various components in the electronic device 700 are coupled together through a bus system 705. It may be understood that the bus system 705 is used to implement connection and communication among these components. Besides a data bus, the bus system 705 also includes a power bus, a control bus, and a status signal bus. However, for the sake of clear description, the various buses are marked as the bus system 705 in FIG. 17.

It may be understood that the memory 702 may be a volatile memory or a non-volatile memory and may also include both the volatile memory and non-volatile memory. The non-volatile memory may be a ROM, a programmable read-only memory (PROM), an erasable programmable read-only memory (EPROM), an electrically erasable programmable read-only memory (EEPROM), a ferromagnetic random access memory (FRAM), a flash memory, a magnetic surface memory, a compact disk, or a compact disc read-only memory (CD-ROM). The magnetic surface memory may be a magnetic disk storage or a magnetic tape storage. The volatile memory may be a random access memory (RAM) used as an external cache. By way of exemplary but not restrictive description, many forms of RAM are available, such as static random access memory (SRAM), synchronous static random access memory (SSRAM), dynamic random access memory (DRAM), synchronous dynamic random access memory (SDRAM), double data rate synchronous dynamic random access memory (DDRSDRAM), enhanced synchronous dynamic random access memory (ESDRAM), synclink dynamic random access memory (SLDRAM), or direct rambus random access memory (DRRAM). The memory 702 described in the embodiments of the disclosure is intended to include, but not limited to, these and any other suitable types of memories.

The memory 702 in the embodiments of the disclosure is used to store various types of data to support the operation of the electronic device 700. Examples of these data include: any computer program used to operate on the electronic device 700, such as an application program 7022. The program for implementing the method of the embodiments of the disclosure may be included in the application program 7022.

The method disclosed in the foregoing embodiments of the disclosure may be applied in the processor 701 or may be implemented by the processor 701. The processor 701 may be an integrated circuit chip with signal processing capabilities. In the implementation process, the steps of the foregoing method may be completed by an integrated logic circuit of hardware or a instruction in the form of software in the processor 701. The aforementioned processor 701 may be a general-purpose processor, a digital signal processor (DSP), or other components such as a programmable logic device, a discrete gate, a transistor logic device, a discrete hardware component, and the like. The processor 701 may implement or execute the various methods, steps, and logical block diagrams disclosed in the embodiments of the disclosure. The general-purpose processor may be a microprocessor or any conventional processor or the like. The steps of the method disclosed in the embodiments of the disclosure may be directly implemented as being executed and completed by a hardware decoding processor, or may be executed and completed by a combination of hardware and software modules in a decoding processor. The software module may be located in a storage medium, and the storage medium is located in the memory 702. The processor 701 reads the information in the memory 702 and completes the steps of the foregoing method in combination with its hardware.

In an exemplary embodiment, the electronic device 700 may be implemented by one or a plurality of application specific integrated circuits (ASICs), a DSP, programmable logic device (PLD), complex programmable logic device (CPLD), FPGA, general-purpose processor, controller, MCU, MPU, or other electronic components configured for performing the foregoing method.

The embodiments of the disclosure also provide a storage medium configured for storing a computer program.

Optionally, the storage medium may be applied to the terminal device in the embodiments of the disclosure, and the computer program causes the computer to execute the corresponding process in each method executed by the terminal device in the embodiments of the disclosure. For the sake of brevity, repeated description is not provided herein.

Optionally, the storage medium may be applied to the master node in the embodiments of the disclosure, and the computer program causes the computer to execute the corresponding process in each method executed by the master node in the embodiments of the disclosure. For the sake of brevity, repeated description is not provided herein.

The disclosure is described with reference to flow charts and/or block diagrams of methods, devices (systems), and computer program products according to the embodiments of the disclosure. It should be understood that each process and/or block in each flow chart and/or block diagram, and the combination of processes and/or blocks in the flow charts and/or block diagrams may be implemented by computer program instructions. These computer program instructions may be provided to the processor of a general-purpose computer, a special-purpose computer, an embedded processor, or other programmable data processing devices to produce a machine. In this way, the instructions executed by the processor of the computer or other programmable data processing devices generate a device for implementing the functions specified in one or more processes in the flow chart and/or one or more blocks in the block diagram.

These computer program instructions may also be stored in a computer-readable memory that may guide a computer or other programmable data processing devices to work in a specific manner. In this way, the instructions stored in the computer-readable memory generate an article of manufacturing including the instruction device. The instruction device implements the functions specified in one or more processes in the flow chart and/or one or more blocks in the block diagram.

These computer program instructions may also be loaded onto a computer or other programmable data processing devices, so that a series of operation steps may be executed on the computer or other programmable devices to generate processing of computer implementation. As such, the instructions executed on the computer or other programmable devices provide steps for implementing the functions specified in one or more processes in the flow chart and/or one or more blocks in the block diagram.

It should be understood that the terms "system" and "network" used in the disclosure may be used interchangeably most of the time in the specification. The term "and/or" in the disclosure is merely an association relationship that describes the associated objects, indicating that there may be three types of relationships. For instance, A and/or B may mean that: A exists alone, A and B exist at the same time, and B exists alone. Besides, the character "/" in the disclosure generally indicates that the associated objects before and after are in an "or" relationship.

The above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A cell accessing method, comprising:
    transmitting, by a terminal device, first indication information to a master node, wherein the first indication information is used for indicating information of a target primary secondary cell (PSCell) to be accessed by the terminal device, the information of the target PSCell comprises:
        a cell global identifier (CGI) of the target PSCell, wherein the CGI of the target PSCell comprises: an evolved universal terrestrial radio access network cell global identifier (ECGI) or a new radio cell global identifier (NCGI); and
    transmitting, by the terminal device, a second RRC reconfiguration complete message to the master node, wherein the second RRC reconfiguration complete message is configured for being transmitted to a secondary node corresponding to the target PSCell by the master node according to the first indication information.

2. The method according to claim 1, wherein the information of the target PSCell further comprises at least one as follows:
    a physical cell identifier (PCI) and frequency point information of the target PSCell, and
    index information of the target PSCell.

3. The method according to claim 1, wherein the first indication information is carried in a first radio resource control (RRC) reconfiguration complete message.

4. The method according to claim 1, wherein the second RRC reconfiguration complete message is carried in the first RRC reconfiguration complete message.

5. The method according to claim 1, wherein the first indication information is used for a conditional PSCell addition procedure, or
    the first indication information is used for a conditional PSCell change procedure.

6. A cell accessing method, comprising:
    receiving, by a master node, first indication information transmitted by a terminal device, wherein the first indication information is used for indicating information of a target primary secondary cell (PSCell) to be accessed by the terminal device, the information of the target PSCell comprises:
        a cell global identifier (CGI) of the target PSCell, wherein the CGI of the target PSCell comprises: an evolved universal terrestrial radio access network cell global identifier (ECGI) or a new radio cell global identifier (NCGI);
    receiving, by the master node, a second RRC reconfiguration complete message transmitted by the terminal device; and
    transmitting, by the master node, the second RRC reconfiguration complete message to a secondary node corresponding to the target PSCell according to the first indication information.

7. The method according to claim 6, wherein the information of the target PSCell further comprises at least one as follows:
    a physical cell identifier (PCI) and frequency point information of the target PSCell, and
    index information of the target PSCell.

8. The method according to claim 6, wherein the first indication information is carried in a first radio resource control (RRC) reconfiguration complete message.

9. The method according to claim 6, wherein the second RRC reconfiguration complete message is carried in the first RRC reconfiguration complete message.

10. The method according to claim 6, wherein the first indication information is used for a conditional PSCell addition procedure, or
    the first indication information is used for a conditional PSCell change procedure.

11. A terminal device, comprising:
    a transmitter, configured for transmitting first indication information to a master node, wherein the first indication information is used for indicating information of a target primary secondary cell (PSCell) to be accessed by the terminal device, the information of the target PSCell comprises:
        a cell global identifier (CGI) of the target PSCell, wherein the CGI of the target PSCell comprises: an evolved universal terrestrial radio access network cell global identifier (ECGI) or a new radio cell global identifier (NCGI), and
    the transmitter is further configured for transmitting a second RRC reconfiguration complete message to the master node, wherein the second RRC reconfiguration complete message is configured for being transmitted to a secondary node corresponding to the target PSCell by the master node according to the first indication information.

12. The terminal device according to claim 11, wherein the information of the target PSCell further comprises at least one as follows:
    a physical cell identifier (PCI) and frequency point information of the target PSCell, and
    index information of the target PSCell.

13. The terminal device according to claim 11, wherein the first indication information is carried in a first radio resource control (RRC) reconfiguration complete message.

14. The terminal device according to claim 11, wherein the first indication information is used for a conditional PSCell addition procedure, or
    the first indication information is used for a conditional PSCell change procedure.

* * * * *